United States Patent [19]

Thome et al.

[11] Patent Number: 5,210,847
[45] Date of Patent: May 11, 1993

[54] NONCACHEABLE ADDRESS RANDOM ACCESS MEMORY

[75] Inventors: Gary W. Thome; James H. Nuckols, both of Houston; Paul R. Culley, Cypress; Gary L. Brasher, Houston, all of Tex.

[73] Assignee: Compaq Computer Corporation, Houston, Tex.

[21] Appl. No.: 354,513

[22] Filed: May 19, 1989

[51] Int. Cl.[5] .................... G06F 12/06; G06F 13/00
[52] U.S. Cl. ............................ 395/425; 364/DIG. 1; 364/243.41; 364/243.43
[58] Field of Search ............... 364/DIG. 1, DIG. 2, 364/243.41, 243.43; 395/425

[56] References Cited

U.S. PATENT DOCUMENTS

| | | | |
|---|---|---|---|
| 4,622,631 | 11/1986 | Frank et al. | 364/200 |
| 4,665,506 | 5/1987 | Cline et al. | 365/189 |
| 4,669,043 | 5/1987 | Kaplinsky | 364/200 |
| 4,831,581 | 5/1989 | Rubinfeld | 364/200 |
| 4,899,275 | 2/1990 | Sachs et al. | 364/200 |
| 4,992,930 | 2/1991 | Gilfeather et al. | 364/DIG. 1 |
| 5,045,998 | 9/1991 | Begun et al. | 364/200 |
| 5,056,015 | 10/1991 | Baldwin et al. | 364/DIG. 1 |
| 5,091,850 | 2/1992 | Culley | 364/DIG. 1 |

OTHER PUBLICATIONS

Intel Advance Information, Oct. 1987, 82385 High Performance 32 Bit Cache Controller.
Compaq Computer Corp., 1 Compaq Deskpro 386/20 Personal Computer Technical Reference Guide, pp. 2-108 to 2-122 (1987).
Intel Corp., 1 Microprocessor and Peripheral Handbook, Microprocessor, pp. 4-287 to 4-332 (1988).

Primary Examiner—Alyssa H. Bowler
Attorney, Agent, or Firm—Pravel, Hewitt, Kimball & Krieger

[57] ABSTRACT

A computer system uses a random access memory to store memory characteristic information, such as noncacheable status. The memory is coupled to the processor address lines to produce an output representative of the memory address block, the output used as appropriate, for example by the noncacheable address input of a cache controller. Latches are used to store programming mode, write or read operation and data values. The reading and writing of the random access memory is performed without disturbing the main memory.

12 Claims, 4 Drawing Sheets

NONCACHEABLE ADDRESS RANDOM ACCESS MEMORY

BACKGROUND OF THE INVENTION

1. Field of the Invention

The invention relates to computer systems utilizing cache memory systems, and more particularly to computer systems where certain ranges of main memory address are not cacheable.

2. Description of the Related Art

Computer system users are always requesting more powerful, faster computers. Just as this was true in large computer systems, it is also true in personal computers. For this reason faster processors and memories have continually been developed and utilized. The development of microprocessors has outstripped the development of affordable, equally fast memory devices. As a result, users are often cost limited as to the performance of the system. This problem was partially resolved by the use of cache memory systems, which use small amounts of faster, expensive memory and large amounts of slow, inexpensive memory. Portions of the data in the slow memory were copied into the fast memory, with a cache controller determining when the available information was in the fast memory, allowing a quicker cycle to be performed. Performance levels were improved while costs remain satisfactory.

However, personal computer systems are flexible units which can be configured in many different ways. For example, personal computers compatible with personal computers developed by International Business Machines Corp. (IBM) can have memory logically located in varying locations, depending on the specific design. Conventionally, certain portions of the memory have not been cacheable because devices share the memory, such as video display systems, the memory is read only (ROM), or the location is not readable and writable, such as device control registers. Thus, certain locations in the memory map must be indicated as noncacheable to any controller handling the cache system.

Because of the speeds of operation in cache systems, a signal indicating that a given memory area was noncacheable had to be produced very quickly. Thus, programmable array logic (PAL) devices were utilized to perform the decoding. However, as noted above, personal computers are very flexible systems which can be easily reorganized by users by the addition of individual circuit boards. These boards may change the cacheability of portions of the memory space of the computer system. But PAL's cannot be reconfigured by the user and so any PAL's utilized in the system were designed for the lowest common denominator or to certain specific implementations, with restrictions then placed on the added circuit boards. Different PAL's could be inserted, but this could not be done by unskilled users and increased complexity and inventory requirements and so could be used only for large users or large volume applications. This does not solve the problem for small users or special applications.

SUMMARY OF THE INVENTION

A computer system according to the present invention utilizes random access memory (RAM) to perform the decoding function for noncacheable addresses. The RAM is connected with its address inputs connected to the address bus and with a data output coupled to the cache controller's noncacheable address input. When a given address is requested by the microprocessor, the RAM outputs a value indicative of the cacheability of that memory block. Because a RAM is being utilized each memory block can be individually programmed to a proper condition, thus removing the restrictions of the PAL and allowing small users or special applications to have a correctly configured cacheability map.

The RAM is initially loaded during power on self test (POST) operations and can be read or modified at other times. Writing to the RAM is accomplished by setting the desired data value, a write flag and a programming value by performing an Input/Output (I/O) write operation to an I/O port associated with the circuitry of the present invention. The I/O port is read to insure that the I/O write operation is complete. A memory write operation to the desired memory block completes the sequence. The memory write operation is done in a local bus access mode so that the main memory of the system is not affected. This process is repeated for all the memory blocks to insure that the proper values are present in the RAM.

Reading the RAM is accomplished by setting a read flag and the program value by performing an I/O write. An I/O read operation is performed to verify the request and a local bus memory write operation to the desired block is performed. After the RAM data value is latched into a flip-flop during the memory write operation, the data value can be read by performing an I/O port read operation.

Thus, the present invention allows improved flexibility in a computer system using a memory cache of the cacheability of a given memory block.

BRIEF DESCRIPTION OF THE DRAWINGS

A better understanding of the invention can be had when the following detailed description of the preferred embodiment is considered in conjunction with the following drawings, in which.

DETAILED DESCRIPTION OF THE PREFERRED EMBODIMENT

Figure 1:
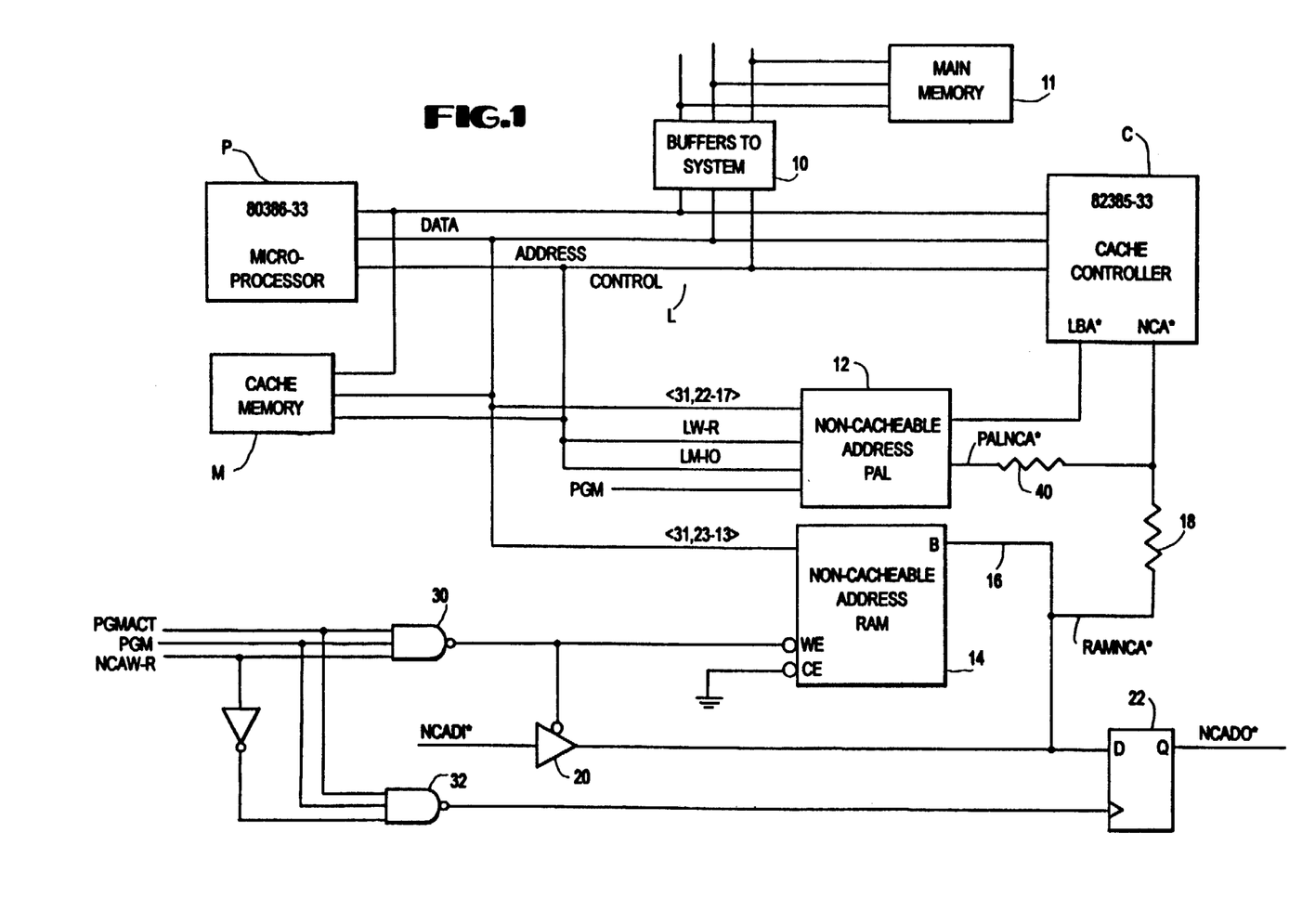
FIGS. 1 and 2 are schematic diagrams of portions of a computer system incorporating the present invention.

Referring now to FIG. 1, the letter P generally represents a microprocessor, the letter M generally represents cache memory and the letter C generally represents a cache controller in a computer system incorporating the present invention. Preferably, the microprocessor P is an Intel Corporation 80386-33 and the cache controller C is an Intel Corporation 82385-33, for reasons which will be explained. The microprocessor P, the cache memory M and the cache controller C are connected in a conventional manner with the resulting formation of local data, address and control busses L. These local busses L are interfaced to the remaining portions of the computer system, including main memory 11, by a series of buffers and transceivers 10.

The cache controller C has two inputs of particular interest in this invention. The first input is the LBA* input or local bus access input. When this input is low at the appropriate time, the cache controller C acknowledges that the operation which is being requested by the microprocessor P is being directed to a device on the local bus L and not to portions of the computer system coupled by the buffers and transceivers 10. During local bus accesses, the cache controller C does not control operation of the various devices and is essentially idle.

The other input of interest is the NCA* or noncacheable address input. When a low signal at the appropriate time is received on this input, the cache controller C understands that this particular memory address is not cacheable and therefore passes the operation on through to the memory devices external to the local bus L without affecting the cache memory M.

The LBA* signal is generated by a noncacheable address (NCA) programmable array logic (PAL) device 12. The NCA PAL 12 utilizes the LW-R signal, the LM-IO signal and the PGM signal to determine the LBA* signal. The LW-R signal is the write or read indication signal present on the local control bus and the LM-IO signal is the memory space or I/O space indication signal present on the local bus L as developed by the processor P. The PGM signal is the signal which is present to indicate that programming of an NCA random access memory (RAM) 14 is desired. The relevant equation in the NCA PAL 12 is as follows:

$$LBA = LM - I/O \cdot LW\text{-}R \cdot PGM$$

Therefore, whenever there is a memory write operation and the PGM bit or signal is set high, the LBA* signal is made low to indicate to the cache controller C that a local bus operation is being performed. This condition is provided so that the memory write operation does not affect the memory of the computer system but is instead directed only to the NCA RAM 14.

The NCA RAM 14 is used to store the data values indicating whether a given block of memory is cacheable or noncacheable. To this end, the NCA RAM 14 has its address inputs connected to various address lines in the local address bus, for example, lines <13-23,31>. The data port 16 of the NCA RAM 14 is connected to the NCA* input of the cache controller C through an optional resistor 18. The resistor 18 is preferably a zero value resistor which can effectively be utilized for jumpering purposes during manufacture. Because the NCA RAM 14 is always enabled, whenever an address is present on the local bus L, the NCA RAM 14 is providing a signal to the NCA* input of the cache controller C, except during write operations to the NCA RAM 14.

The data port 16 of the NCA RAM 14 is also connected to the output of a tristate buffer 20 and the D input of a D-type flip-flop 22. The buffer 20 and the flip-flop 22 are used to interface the data port 16 of the NCA RAM 14 with the processor P to allow programming of the NCA RAM 14 or reading of value stored in the NCA RAM 14.

The NCA RAM 14 is preferably a very fast static RAM, such as a 15 nanosecond RAM. This high speed is necessary because of the high speed operation of the microprocessor P and the cache controller C and of the timing requirements between the presentation of the address values on the local bus L and the need for the NCA* signal to be valid to the cache controller C. This is possible utilizing an NCA RAM 14 of the speed indicated when utilizing the preferred 80386-33 microprocessor P and the preferred 82385-33 cache controller C. For example, had the 20 MHz version of the above-referenced units been utilized, this invention would not be possible with RAM's which are readily available at this time. The 82385-20 requires that the NCA* signal be valid 10 nanoseconds prior to the beginning of a PHI1 of the CLK2 signal. However, the 80386-20 cannot guarantee that at a 20 MHz clock rate the address information is present until 20 nanoseconds prior to this same edge of CLK2. Therefore, this leaves only 10 nanoseconds from guaranteed address valid to the time the NCA* signal must be valid. This cannot be done with available RAM memories of sufficient size and therefore the PAL version had to be previously utilized In the above-mentioned 80386-33 and 82385-33 units, the timings have been changed so that the NCA* signal must be valid 13 nanoseconds prior to the PHI2 portion of the CLK2 signal cycle in the CLK2 signal cycle following the addresses becoming valid on the 80386-33. The 80386-33 worst case presentation of the address value is 30 nanoseconds prior to this edge, therefore leaving a worst case timing of 17 nanoseconds between the known validity of the address data and the need for the NCA* signal to be valid. Thus, a 15 nanosecond NCA RAM 14 as utilized in the preferred embodiment is capable of performing the necessary operations.

Figure 2:
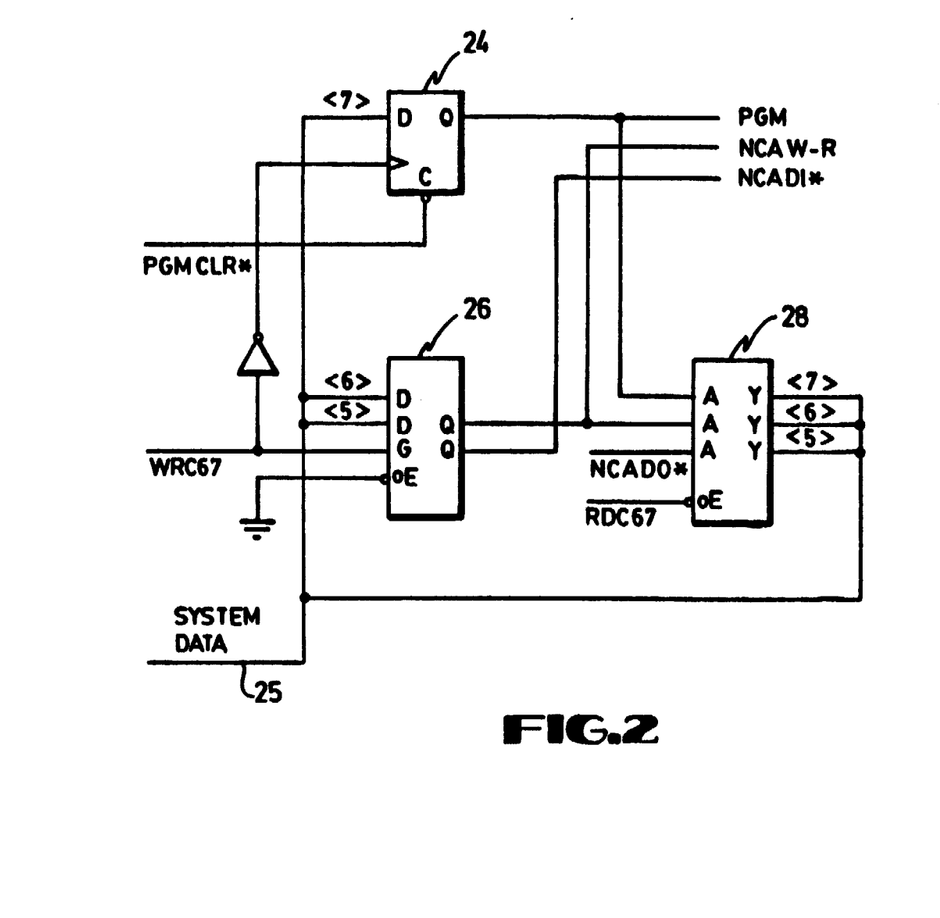

Because the NCA RAM 14 is a random access memory, when it is initially powered up, random and possibly improper values are stored in the NCA RAM 14. Therefore, it is necessary to write desired values into the NCA RAM 14. This is accomplished by the use of several registers and certain gates. An input/output (I/O) port designated as C67 in the computer system of the preferred embodiment is assigned to have certain bits relating to programming, that is reading or writing, the NCA RAM 14. Three bits in I/O port C67 are utilized in programming the NCA RAM 14. The three bits are designated the PGM bit, the NCAW-R bit and the NCAD* bit. The NCAD* bit is actually two different bits, NCADI* for input or write purposes and NCADO* for output or read purposes. The PGM bit is stored in a D-type flip-flop 24 (FIG. 2). Bit 7 of the system data bus 25 is connected to the D input, with the clock input being the inverted version of a WRC67 signal. The WRC67 signal is a signal which goes high when a valid write operation is being performed to I/O port 67, with the timing such that the data is valid prior to the falling edge of the WRC67 signal. Thus, this means that the rising edge of the clock signal provided to the PGM flip-flop 24 is of such a phase and sequence that the data is present on the system data bus 25 and is latched into the PGM flip-flop 24. The noninverting output of the PGM flip-flop 24 provides the PGM signal.

The NCAW-R and NCADI* bits, that is the noncacheable address write and noncacheable address data input bits, are stored by a latch 26. Bits 6 and 5, respectively, of the system data bus 25 are connected to the latch 26, with the WRC67 signal connected to the enable input of the latch 26. The timing of the WRC67 signal is such that the data is present and latched into the latch 26 where the WRC signal goes low. The outputs of the latch 26 corresponding to the NCAW-R and NCADI* bits produce the NCAW-R and NCADI* signals. The utilization of the signals is as follows: the PGM signal is utilized to indicate that the programming mode of the NCA RAM is desired. The NCAW-R signal is utilized to indicate whether the NCA RAM 14 will have data values written to it or read from it. The NCADI* signal is used as the input path to the NCA RAM 14 and is connected to the input of the buffer 20.

The PGM, NCAW-R signals and a signal referred to as the NCADO* signal, the output of the flip-flop 22, are connected as inputs to a buffer 28. The buffer 28 is used to control the presentation of these three signals onto the system data bus 25 at bit positions <7-5>. The output control of the buffer 28 is based on a signal referred to as RDC67, which has timing such that it is valid low when a read request to I/O port C67 is being presented by the processor P. Thus, this combination of PGM flip-flop 24, latch 26 and buffer 28 allow the PGM, NCAW-R, NCADI* and NCADO* signals to be read or written by the processor P.

The NCADI* signal is presented to the input of buffer 20 whose output is connected to the data port 16 of the NCA RAM 14. The NCADI* signal value is latched into the NCA RAM 14 when the output of a three input NAND gate 30 (FIG. 1) goes high. The output of the NAND gate 30 is connected to the write enable input of the NCA RAM 14. The three inputs to the NAND gate 30 are the PGM and NCAW-R signals and a signal referred to as PGMACT. The PGMACT signal is a signal that indicates that programming mode is active, that a memory operation is being performed, that the memory operation is a write operation and that it is an appropriate time to latch data into the NCA RAM 14 or to present data to the flip-flop 22. Thus, when the PGM and NCAW-R signals are high, indicating a desire to do a programming mode write operation, the next memory write operation produces a write pulse out of the NAND gate 30. The output of the NAND gate 30 is also connected to the buffer control input of the NCADI* buffer 20, so that when the output of the NAND gate 30 is low, the data value which is present at the buffer 20, that is the NCADI* value, is transmitted to the data port 16 for storage in the NCA RAM 14 at the location determined by the address of the memory write operation. The PGMACT signal has a width such that the data is presented to the NCA RAM 14 for an adequate period of time. Because of the timing and location of the PGMACT signal, the data which is present at the NCADI* signal is stored in the address given by the memory write operation which has been requested by the processor P. Therefore, by properly sequencing through blocks of the address and repeating the programming and data value positioning in the register and latch 26, the NCA RAM 14 can properly be loaded with desired data values.

A signal referred to as PGMCLR* is connected to the clear input of the PGM flip-flop 24. The PGMCLR* signal is such that it goes low for a short period after the PGMACT signal is no longer true. Thus, after each programming mode memory write operation, the PGM flip-flop 24 is cleared so that should further memory write operations occur, the contents of the NCA RAM 14 at the memory address are not accidentally changed to undesired values.

Reading data from the NCA RAM 16 utilizes the flip-flop 22. A NAND gate 32 is utilized to clock the data present at the output of the data port 16 of the NCA RAM 14 into the flip-flop 22. The output of the NAND gate 32 is connected to the clocking input of flip-flop 22 and the NAND gate 32 has three inputs. The three inputs are the PGM signal, the PGMACT signal and the inversion of the NCAW-R signal. Thus, during program mode memory write operations in which the NCAW-R bit is set low, the data that is presented by the NCA RAM 14 is latched by the flip-flop 22, whose output is the NCADO* signal. The processor P can then read the I/O port C67 to obtain the particular noncacheable value which is stored in the RAM 14 at the memory block which had been addressed in the memory write operation. The automatic clearing of PGM flip-flop 24 by the PGMCLR* signal prevents the accidental reading of an undesired noncacheable value.

In the embodiment shown in FIG. 1, it is to be noted that there is an output from the NCA PAL 12 called the PALNCA* signal. This signal is connected through a resistor 40 to the NCA* input of the cache controller C. In this manner, it is possible to develop circuit boards which can utilize either the PAL's as in the previous designs or the NCA RAM 14 as utilized in the present invention, allowing additional flexibility to the system designer or system user. The resistor 18 or 40 of the non-desired mode of presenting the NCA* signal to the cache controller C is removed so that a connection is actually not present and thus there is no interference between the two signals as developed by the NCA PAL 12 and the NCA RAM 14.

It is noted that the memory write operations which are utilized to read from or write to the NCA RAM 14 are being performed in local bus mode as determined by the NCA PAL 14. Thus, the write operations do not affect other memory which can be present in the system on other than the local bus.

Figure 3:
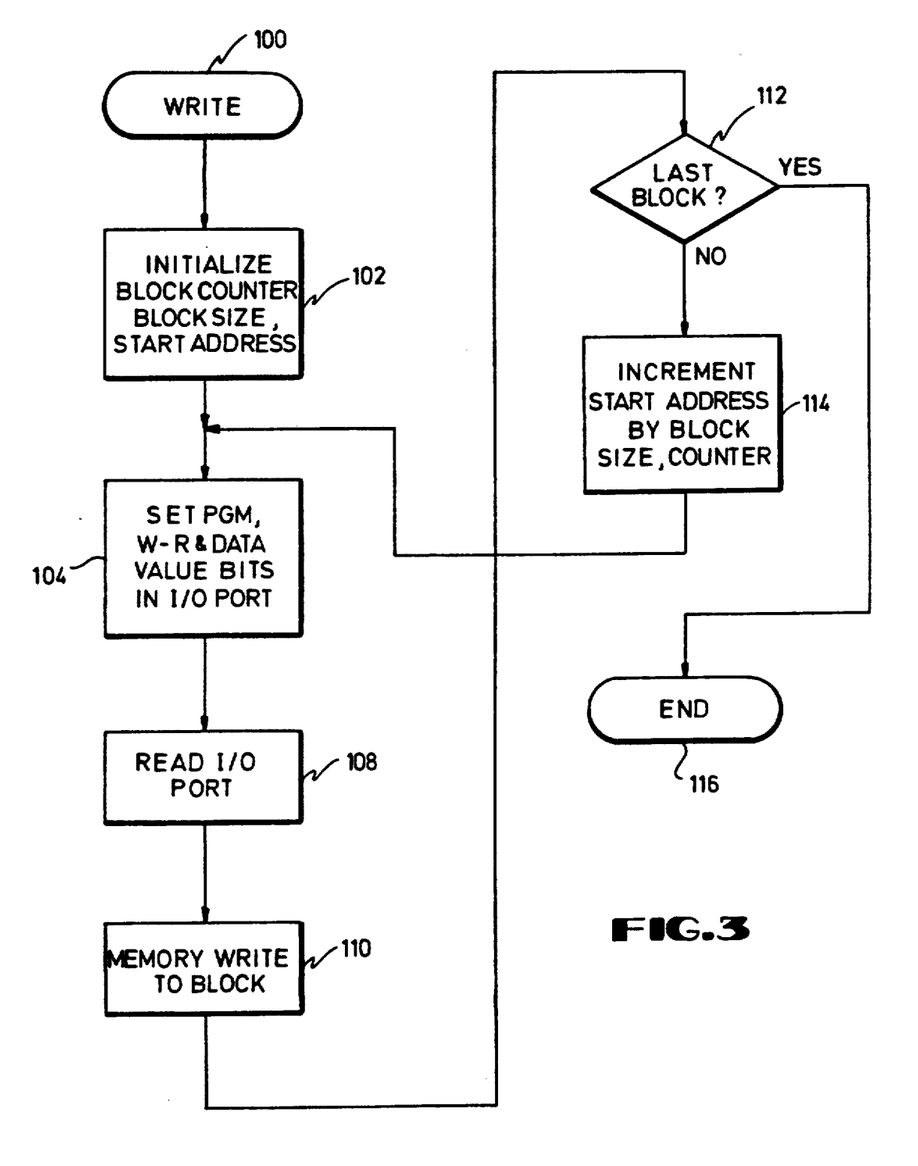
FIGS. 3 and 4 are flowchart illustrations of sequences for storing data in and reading data from a memory according to the present invention.

FIG. 3 shows a write sequence 100 utilized with circuitry as indicated in FIGS. 1 and 2 for writing values to the NCA RAM 14. In step 102, various values are initialized. These values include a counter which is to count the number of memory blocks which are to be programmed, the memory block size and the starting address of the memory blocks to be programmed. Control proceeds to step 104, where the processor P writes to I/O port C67, setting the PGM and NCAW-R signals high and setting the NCADI* signal as desired for that particular memory block. In step 108, the processor P reads I/O port C67. This read operation is necessary because the cache controller C posts write operations and therefore the I/O port write operation may not be completed before the local bus memory write operation which sets the NCA RAM 14 value. This I/O read operation forces the I/O write operation to be completed, so that the values are properly stored in I/O port C67. Control proceeds to step 110, where a memory write operation to the memory block as indicated by the start address value is performed. This memory write operation thus automatically loads the value which had been written to the NCADI* bit into the NCA RAM 14 at the location as identified by the address lines connected to the NCA RAM 14. Control proceeds to step 112, where a determination is made as to whether the last memory block necessary has been programmed into the NCA RAM 14. If not, control proceeds to step 114, where the starting address is incremented by the block size and the memory block counter is incremented. Control then proceeds to state 104 to continue the sequence of programming the NCA RAM 14.

If it was determined in step 112 that the last block of memory had been programmed, then control proceeds to step 116 which is the end of the write sequence 100, with control generally being passed to other portions of the power on self test (POST) routine utilized in a computer system. Thus, the processor P can quickly and easily program the NCA RAM 14 with all the desired memory noncacheable address data values appropriate for each memory block.

Figure 4:
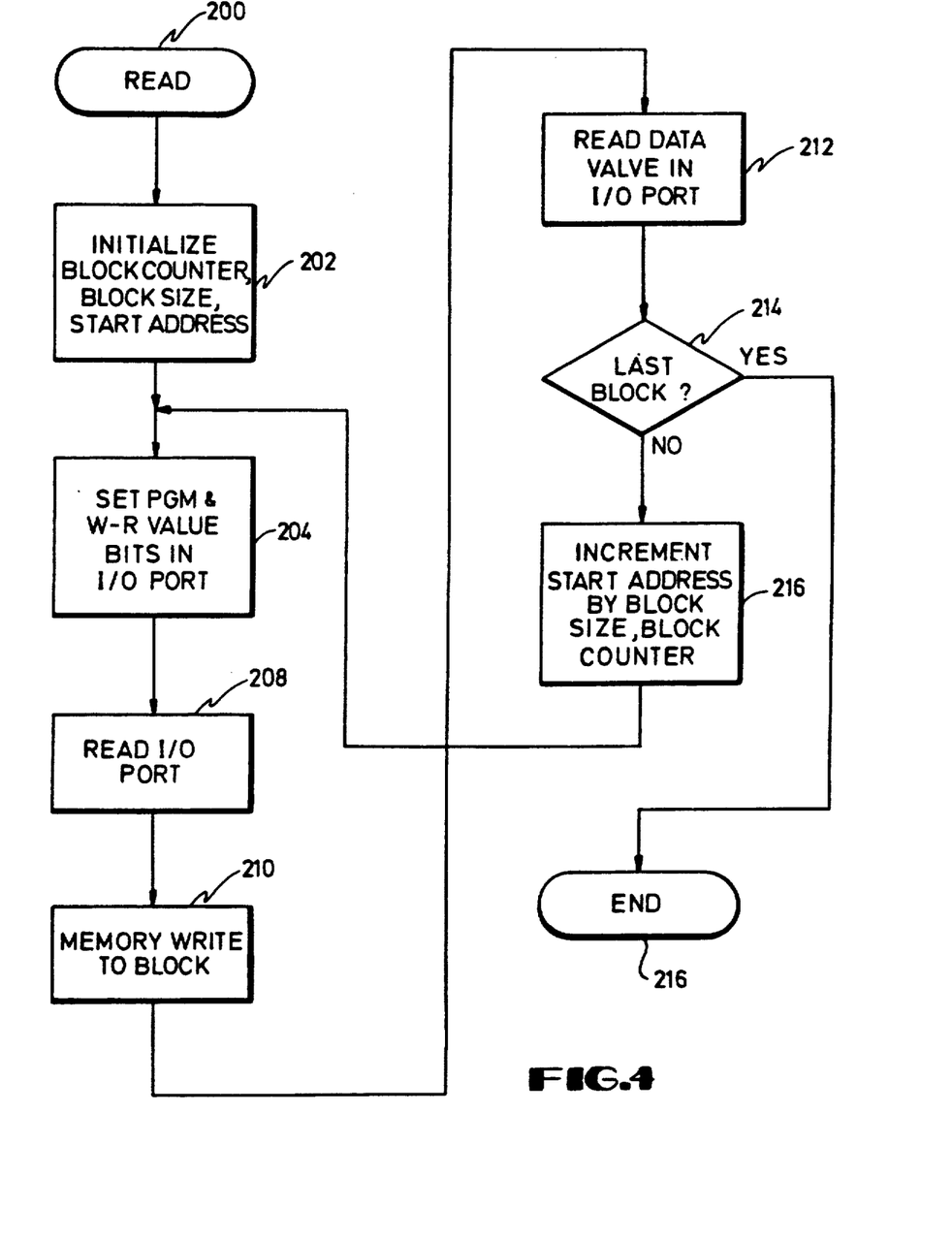

An exemplary read sequence 200 utilized to read the noncacheable values of a series of blocks starts at step 202 (FIG. 4). In step 202 a number of values such as the block counter, the block size and the starting memory address are initialized as desired. Control proceeds to step 204, where I/O port C67 is written, setting the PGM value high and the W-R value low to indicate programming mode operation and a read operation to be performed. Control proceeds to step 208, where the processor P reads I/O port C67 for reasons indicated above. Control proceeds from step 208 to step 210, where a memory write operation is performed to the memory block as indicated by the starting address. This memory write operation causes the data value which is present in the NCA RAM 14 to be latched into the flip-flop 22. The processor P then reads I/O port C67 in step 212. The value returned at bit 5 of the data word is the NCAD0* signal, which allows the processor P to determine the noncacheable data value which is present in the NCA RAM 14 at the location of the memory block which was present in the memory write operation of step 210. Control proceeds to step 214, where a determination is made if this was the last block which is desired to be read. If not, control proceeds to step 216, where the starting address is incremented by the block size and the block counter is incremented as needed. Control proceeds to step 204 and the operation is performed again. If this was the last block, control proceeds from step 214 to step 216, which is the end of the sequence 200, and to the next operation which is to be performed by the computer system.

Sequences similar to FIGS. 3 and 4 can be utilized either in the POST-portion operations during the computer system power-up phases or can be utilized in separate applications programs or utility programs which can change the noncacheable portions of the memory as desired.

It is noted that a memory read operation is not utilized for the NCA RAM 14 read operation because memory read operations are utilized to obtain the instructions and possible data for the processor P and therefore numerous read operations will occur prior to the presentation of the appropriate address on the address bus. However, by proper control, no memory write operations will occur. It is also noted that while the NCA RAM 14 is preferably a conventional random access memory, it can also be an electrically erasable programmable read only memory (EEPROM) or similar memory having a sufficiently fast access time. If an EEPROM is utilized the write operation is not necessary on system power up after the initial programming, but is changed only when map changes are desired.

Thus it can be seen that this technique allows the development of a very flexible system for determining the characteristics of a given memory block, for example, when a given memory address block is noncacheable, so that individual users can adjust the characteristic map of their individual computer system if desired.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer system, comprising:

a processor having a plurality of address lines for requesting stored information;

cache memory for storing information and coupled to said address lines;

a cache memory controller coupled to said address lines to determine if said requested stored information is stored in said cache memory and having a noncacheable address input for receiving a signal indicating whether said requested information is cacheable;

random access memory not forming a portion of said cache controller and having a plurality of address inputs, a write enable input, a data input and a data output for storing data values representing the cacheable status of a memory block, said address inputs of sad random access memory coupled to said address lines for addressing said data values and said data output of said random access memory coupled to said noncacheable address input;

means for indicating a write request of said random access memory; and means for storing said cacheable status data values in said random access memory, wherein said storing means includes means for storing a value indicative of a programming mode request, means for storing said cacheable status data values prior to being stored in said random access memory and means responsive to a memory write operation, said programming mode request value and said write request indication for enabling said stored data value to said random access memory data input and for providing a value to said random access memory write enable input to allow said random access memory to store said stored data value.

2. The computer system of claim 1, wherein said storing means further includes means for clearing said programming mode request value after a memory write operation.

3. The computer system of claim 2, wherein said storing means further includes means for designating said memory write operation as a local bus operation.

4. A computer system, comprising:

a processor having a plurality of address lines for requesting stored information;

cache memory for storing information and coupled to said address lines;

a cache memory controller coupled to said address lines to determine if said requested stored information is stored in said cache memory and having a noncacheable address input for receiving a signal indicating whether said requested information is cacheable;

random access memory not forming a portion of said cache controller and having a plurality of address inputs, and a data output for storing data values representing the cacheable status of a memory block, said address inputs of said random access memory coupled to said address lines for addressing said data values and said data output of said random access memory coupled to said noncacheable address input;

means for indicating a write request of said random access memory; and means for reading said cacheable status data values from said random access memory, wherein said reading means includes means for storing a value indicative of a programming mode request and means coupled to said random access memory data output for storing a data value contained in said random access memory for reading by said processor, wherein said data value storing means includes a data latching input and said reading means further includes means responsive to a memory write operation, said programming mode request value and said read request indication for providing a signal to said data value storing means to allow said data value storing means to store the data value provided by said random access memory.

5. The computer system of claim 4, wherein said reading means further includes means for clearing said programming mode request value after a memory write operation.

6. The computer system of claim 5, wherein said reading means further includes means for designating said memory write operation as a local bus operation.

7. A computer system, comprising:
- a bus having a plurality of address lines for requesting or storing information and a plurality of data lines for transferring information;
- memory having address inputs coupled to said address lines and data ports coupled to said data lines;
- random access memory for storing memory characteristic values, said memory characteristic values signifying particular characteristics of said memory, having address inputs coupled to said address lines for addressing said characteristic values, a write enable input, a data input and a data output;
- means for indicating a write request of said random access memory; and
- means coupled to said data output of said random access memory for interpreting said characteristic values and performing the proper operation based on said interpretation; and
- means for storing said characteristic data values in said random access memory, wherein said storing means includes means for storing a value indicative of a programming mode request, means for storing said cacheable status data values prior to being stored in said random access memory and means responsive to a memory write operation, said programming mode request value and said write request indication for enabling said stored data value to said random access memory data input and for providing a value to said random access memory write enable input to allow said random access memory to store said stored data value.

8. The computer system of claim 7, wherein said storing means further includes means for clearing said programming mode request value after a memory write operation.

9. The computer system of claim 8, wherein said storing means further includes means for designating said memory write operation as a local bus operation.

10. A computer system, comprising:
- a bus having a plurality of address lines for requesting or storing information and a plurality of data lines for transferring information;
- memory having address inputs coupled to said address lines and data ports coupled to said data lines;
- random access memory for storing memory characteristic values, said memory characteristic values signifying particular characteristics of said memory, having address inputs coupled to said address lines for addressing said characteristic and a data output;
- means for indicating a read request of said random access memory;
- means coupled to said data output of said random access memory for interpreting said characteristic values and performing the proper operation based on said interpretation; and
- means for reading said characteristic data values from said random access memory, wherein said reading means includes means for storing a value indicative of a programming mode request and means coupled to said random access memory data output for storing a data output value contained in said random access memory for reading over said bus, wherein said data value storing means includes a data latching input and said reading means further includes means responsive to a memory write operation, said programming mode request value and said read request indication for providing a signal to said data value storing means to store the data value provided by said random access memory.

11. The computer system of claim 10, wherein said reading means further includes means for clearing said programming mode request value after a memory write operation.

12. The computer system of claim 11, wherein said reading means further includes means for designating said memory write operation as a local bus operation.

* * * * *

UNITED STATES PATENT AND TRADEMARK OFFICE
CERTIFICATE OF CORRECTION

PATENT NO. : 5,210,847
DATED : May 11, 1993
INVENTOR(S) : Gary W. Thome, et al.

It is certified that error appears in the above-identified patent and that said Letters Patent is hereby corrected as shown below:

In col. 8, line 16, please replace "sad" with --said--.

In col. 8, line 62, please replace "write" with --read--.

In col. 9, line 33, please delete "and".

Signed and Sealed this

Eleventh Day of January, 1994

Attest:

BRUCE LEHMAN

Attesting Officer    Commissioner of Patents and Trademarks